(12) United States Patent
Koren et al.

(10) Patent No.: US 12,711,240 B2
(45) Date of Patent: Aug. 18, 2026

(54) TECHNIQUES FOR PROVIDING IDENTITY CYBERSECURITY RISK ASSESSMENT IN DIGITAL ENVIRONMENTS

(71) Applicant: Avalor Technologies, Ltd., Ramat Gan (IL)

(72) Inventors: Yakov Koren, Herzliya (IL); Kfir Aharon Tishbi, Herzliya (IL); Raanan Raz, Tel Aviv (IL)

(73) Assignees: Avalor Technologies, Ltd., Ramat Gan (IL); Zscaler, Inc., San Jose, CA (US)

( * ) Notice: Subject to any disclaimer, the term of this patent is extended or adjusted under 35 U.S.C. 154(b) by 131 days.

(21) Appl. No.: 18/523,244

(22) Filed: Nov. 29, 2023

(65) Prior Publication Data

US 2025/0173444 A1 May 29, 2025

(51) Int. Cl.
*G06F 21/57* (2013.01)

(52) U.S. Cl.
CPC .................................. *G06F 21/577* (2013.01)

(58) Field of Classification Search
None
See application file for complete search history.

(56) References Cited

U.S. PATENT DOCUMENTS

| | | | | |
|---|---|---|---|---|
| 10,395,271 | B2 | 8/2019 | Kassko et al. | |
| 10,754,877 | B2 | 8/2020 | Kassko et al. | |
| 11,783,515 | B2 | 10/2023 | Sheffer et al. | |
| 2020/0259728 | A1 | 8/2020 | Oren et al. | |
| 2020/0336503 | A1 * | 10/2020 | Xu | G06F 11/0772 |
| 2021/0006542 | A1 * | 1/2021 | Myneni | H04L 63/20 |
| 2022/0174079 | A1 * | 6/2022 | Milot | H04L 63/083 |
| 2022/0345457 | A1 * | 10/2022 | Jeffords | G06F 21/6218 |
| 2023/0306127 | A1 * | 9/2023 | Shua | G06F 21/6218 |
| 2024/0126889 | A1 * | 4/2024 | Clark | G06F 21/577 |
| 2024/0250960 | A1 * | 7/2024 | Danino | H04L 63/1425 |

* cited by examiner

*Primary Examiner* — Fatoumata Traore
(74) *Attorney, Agent, or Firm* — Baratta Law PLLC; Lawrence A. Baratta, Jr.

(57) ABSTRACT

A system and method for generating a cybersecurity risk profile based on an identity in a computing environment is disclosed. The method includes: detecting a plurality of identities in a computing environment, each identity including a permission to initiate an action in the computing environment; querying an identity and access management service to detect a permission associated with a first identity of the plurality of identities; accessing an activity log of the computing environment; parsing the activity log to detect an event based on the first identity; and generating an identity risk profile based on: the detected event, and the detected permission.

19 Claims, 6 Drawing Sheets

TECHNIQUES FOR PROVIDING IDENTITY CYBERSECURITY RISK ASSESSMENT IN DIGITAL ENVIRONMENTS

TECHNICAL FIELD

The present disclosure relates generally to access management in computing environments, and specifically to identity-based risk profiles utilized to determine cybersecurity risk and provide access management based thereon.

BACKGROUND

Organizations today having computing infrastructure need to manage access to resources, applications, workloads, user accounts, service accounts, etc. which are deployed in such computing infrastructures. There exist many solutions to manage access, detect mismanagement of access, etc., however as these computing environments grow in complexity, so too do the solutions required additional complexity, or risk a coverage gap.

For example, an organization may employ policies which restrict or grant access to user accounts, user groups, etc. based on such policies. However, these policies are often predefined, and require manual user intervention to update. Furthermore, these policies are often not dynamic, meaning that they cannot adapt to changes in the computing environment.

This is especially an issue for cloud computing environments, whereby the nature of the abstraction such a computing environment provides, virtual workloads such as virtual machines, software containers, serverless functions, and the like, are constantly changing, being spun up, being spun down, patched, etc. Manually keeping up with an evolving environment is not practical, and hence this leads either to protection gaps, or to over-restrictions on what a user account, for example, is allowed to do in a computing environment. This obviously hinders the functionality of the computing environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a plurality of identities in a computing environment, each identity including a permission to initiate an action in the computing environment. Method may also include querying an identity and access management service to detect a permission associated with a first identity of the plurality of identities. Method may furthermore include accessing an activity log of the computing environment. Method may in addition include parsing the activity log to detect an event based on the first identity. Method may moreover include generating an identity risk profile based on: the detected event, and the detected permission. Other embodiments of this aspect include corresponding computer systems, apparatus, and computer programs recorded on one or more computer storage devices, each configured to perform the actions of the methods.

Implementations may include one or more of the following features. Method may include: receiving a request to access a resource in the computing environment, the request including an identifier of the first identity; and determining a cybersecurity risk score based on the resource, and the identity risk profile. Method may include: providing access to the resource in response to determining that the cybersecurity risk score exceeds a threshold; and denying access to the resource in response to determining that the cybersecurity risk score is below the threshold. Method may include: initiating a mitigation action in response to detecting that the cybersecurity risk score exceeds a predetermined threshold. Method may include: generating an alert based on the mitigation action. Method may include: generating a network traffic policy in response to initiating the mitigation action. Method may include: configuring a firewall in the computing environment to filter network traffic based on the generated network traffic policy. Method may include: detecting new activity in the activity log for the first identity; and updating the identity risk profile based on the detected new activity. Method may include: generating an activity baseline for the first identity based on a plurality of events detected in the activity log. Implementations of the described techniques may include hardware, a method or process, or a computer tangible medium.

In one general aspect, non-transitory computer-readable medium may include one or more instructions that, when executed by one or more processors of a device, cause the device to: detect a plurality of identities in a computing environment, each identity including a permission to initiate an action in the computing environment. Medium may furthermore query an identity and access management service to detect a permission associated with a first identity of the plurality of identities. Medium may in addition access an activity log of the computing environment. Medium may moreover parse the activity log to detect an event based on the first identity. Medium may also generate an identity risk profile based on: the detected event, and the detected permission. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a plurality of identities in a computing environment, each identity including a permission to initiate an action in the computing environment. System may in addition query an identity and access management service to detect a permission associated with a first identity of the plurality of identities. System may moreover access an activity log of the computing environment. System may also parse the activity log to detect an event based on the first identity. System may furthermore generate an identity risk profile based on: the detected event, and the detected permission. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: receive a request to access a resource in the computing environment, the request including an identifier of the first identity; and determine a cybersecurity risk score based on the resource, and the identity risk profile. System where the memory contains further instructions which when executed by the processing circuitry further configure the system to: provide access to the resource in response to determining that the cybersecurity risk score exceeds a threshold; and deny access to the resource in response to determining that the cybersecurity risk score is below the threshold. System where the memory contains further instructions which when executed by the processing circuitry further configure the system to: initiate a mitigation action in response to detecting that the cybersecurity risk score exceeds a predetermined threshold. System where the memory contains further instructions which when executed by the processing circuitry further configure the system to: generate an alert based on the mitigation action. System where the memory contains further instructions which when executed by the processing circuitry further configure the system to: generate a network traffic policy in response to initiating the mitigation action. System where the memory contains further instructions which when executed by the processing circuitry further configure the system to: configure a firewall in the computing environment to filter network traffic based on the generated network traffic policy. System where the memory contains further instructions which when executed by the processing circuitry further configure the system to: detect new activity in the activity log for the first identity; and update the identity risk profile based on the detected new activity. System where the memory contains further instructions which when executed by the processing circuitry further configure the system to: generate an activity baseline for the first identity based on a plurality of events detected in the activity log. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
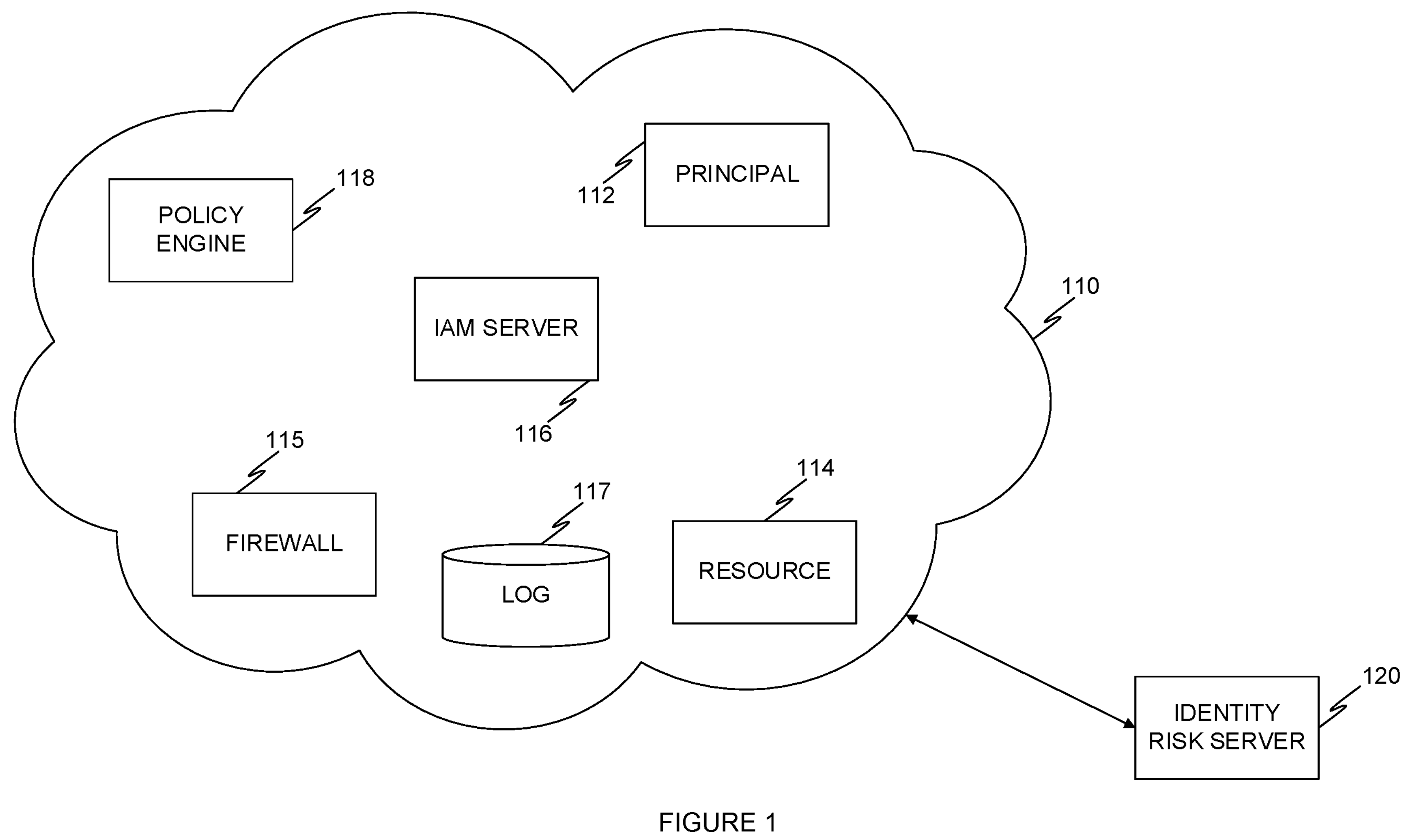
FIG. 1 is an example schematic illustration of a computing environment utilizing an identity risk server, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating an identity-based risk profile which is utilized, according to an embodiment, to determine network access, resource access, and the like, in a computing environment, such as a cloud computing environment.

According to some embodiments, a risk profile is generated based on identity information, device information, and resource information, to determine a level of cybersecurity risk in granting access to the identity (e.g., user account) using a specific device (e.g., personal computer) to access a resource (e.g., a database including sensitive data).

In some embodiments, a firewall, identity and access management service, a combination thereof, and the like, are updated with filtering policies based on a generated risk profile of a specific identity.

FIG. 1 is an example schematic illustration of a computing environment utilizing an identity risk server, implemented in accordance with an embodiment. In an embodiment, a computing environment 110 includes a plurality of principals, such as principal 112. In some embodiments, a principal is a user account, a service account, a role, a user group, a system account, a local account, a combination thereof, and the like. In certain embodiments, a principal includes a unique identifier, such as an email address, user account name, and the like.

In some embodiments, the computing environment 110 includes a plurality of resource 114. In an embodiment, a resource is a bare-metal server, a virtual instance, a virtual machine, a software container, a serverless function, a hardware resource, a software resource, a software as a service (Saas), a platform as a service (PaaS), an infrastructure as a service (IaaS), a combination thereof, and the like.

In certain embodiments, the computing environment 110 is a cloud computing environment, a networked computing environment, an on-prem environment, a hybrid computing environment, a combination thereof, and the like. For example, according to an embodiment, the computing environment 110 is a virtual private cloud (VPC), a virtual network (VNet), and the like. In some embodiments, the computing environment 110 is deployed on a cloud computing infrastructure. In an embodiment, a cloud computing infrastructure is, for example, Amazon® Web Services (AWS), Google® Cloud Platform (GCP), Microsoft® Azure, and the like.

In an embodiment, a principal 112 is an entity which is authorized to act on other entities, such as resource 114. In some embodiments, the computing environment 110 is configured to generate an activity log, stored, for example, in a log database 117.

In some embodiments, the log database 117 includes events, data records, and the like. For example, in an embodiment, the computing environment 110 is configured to generate an activity log detailing network traffic (i.e., a network log). According to an embodiment, a network log includes data records of network traffic, such as a type of message sent over the network, an origin identifier, a destination identifier, a port, an IP address, a name from a namespace, a combination thereof, and the like.

In certain embodiments, the computing environment 110 is configured to generate an activity log of actions initiated by a principal (i.e., identity log). For example, in an embodiment, an identity log includes an event, such as generating a new user, generating a user group, updating permissions of an existing user, various combinations thereof, and the like.

In an embodiment, the computing environment 110 includes, is connected to, or otherwise coupled with, an identity and access management (IAM) server 116. In some embodiments, the IAM server 116 is configured to store identity and access information, such as policies, rules, and the like, which are utilized to determine access to resources based on the permissions and resources.

In some embodiments, the computing environment 110 further includes a firewall 115. In certain embodiments, the firewall 115 is configured to direct, filter, deny, and the like, network traffic (e.g., data packets) over a network. In some embodiments, the firewall is implemented as a web application firewall (WAF).

In an embodiment, the firewall 115 is configured to direct, filter, deny, and the like, network traffic based on a policy, a rule, a condition, a combination thereof, and the like, which is received, accessed, and the like, from the IAM server 116.

In certain embodiments, the computing environment 110 further includes a policy engine 118. In some embodiments, the policy engine 118 is configured to generate, store, a combination thereof, and the like, policies, rules, conditional rules, combinations thereof, and the like. In an embodiment, a policy stored in the policy engine 118 is based on an identifier of a resource, based on a cybersecurity risk score, combinations thereof, and the like.

In some embodiments, the computing environment 110 is accessible by, connected to, coupled with, or otherwise includes, an identity risk server 120. In certain embodiments, the identity risk server 120 is configured to generate a cybersecurity risk profile based on an identity of the computing environment 110.

In an embodiment, the identity risk server 120 is configured to access, receive, and the like, identity information, for example by querying the IAM server 116. In some embodiments, the identity risk server 120 is configured to access, receive, and the like, log data from the log database 117. For example, in an embodiment, the identity risk server 120 is configured to receive a network log stored in the log database, and generate a cybersecurity risk profile for an identity detected in the network log.

In some embodiments, a cybersecurity risk profile includes a risk score, such as a numerical score, a qualitative score, a quantitative score, a combination thereof, and the like, which indicates a measure of cybersecurity risk corresponding to an identity. For example, in an embodiment, an identity, such as a user account, associated with admin permissions, has a high cybersecurity risk. In some embodiments, the user account is associated with limited access permissions, but these permissions include access to a sensitive resource (e.g., a resource such as a database storing thereon sensitive data) and therefore the cybersecurity risk corresponding to such an identity is high.

In an embodiment, the identity risk server 120 is configured to generate a cybersecurity risk profile continuously. In some embodiments, the identity risk server 120 is configured to continuously generate the cybersecurity risk profile, for example by updating a cybersecurity risk score based on new data detected, for example, in a log of the log database 117.

In certain embodiments, the identity risk server 120 is configured to generate the cybersecurity risk profile based on a rule, a conditional rule, a policy, a combination thereof, and the like. According to an embodiment, the identity risk server 120 is configured to generate a behavior baseline for an identity. In an embodiment, a behavior baseline is generated based on data records related to an identity, such as from an activity log, network log, and the like. In an embodiment, a behavior baseline includes a statistical representation of actions, and the like, initiated by an identity, occurring to an identity, and so on.

For example, in an embodiment, a behavior baseline includes a statistical representation which indicates the probability that an identity initiated a certain action. In some embodiments, once a behavior baseline is established for an identity, a new activity is detected (e.g., a new record is detected in an activity log). In certain embodiments, a probability is determined for the new activity to occur based on the established behavior baseline.

According to an embodiment, where the probability is low that an identity associated with the behavior baseline initiated the new activity, a cybersecurity score value is increased, indicating that the new activity possess a greater cybersecurity risk than previous actions undertaken by the identity. In some embodiments, the statistical representation is further based on a timeframe, such as a rolling window (e.g., of activity of the last 30 days).

For example, according to an embodiment, an action initiated by an identity in the computing environment 110 is considered to be anomalous (i.e., having an increased cybersecurity risk score) where the action is preceded by a period where no action at all was initiated by the identity.

In some embodiments, cybersecurity risk is determined based on a device identifier, an IP address, an IP port, a geographical location associated with any of the above, an application identifier, a cybersecurity alert from a cybersecurity monitoring solution, an upload activity, a download activity, an identity associated with a terminated employee, a combination thereof, and the like.

In an embodiment, the identity risk server 120 is further configured to initiate a mitigation action. For example, in an embodiment, the identity risk server 120 is configured to initiate a verification of user credentials, for example in response to determining that a cybersecurity risk score exceeds a predetermined threshold.

In some embodiments, a mitigation actions includes initiating a request for multi-factor authentication (MFA), generating a network traffic policy, generating an access policy, generating an activity-based policy, denying access to a resource, a combination thereof, and the like.

Figure 2:
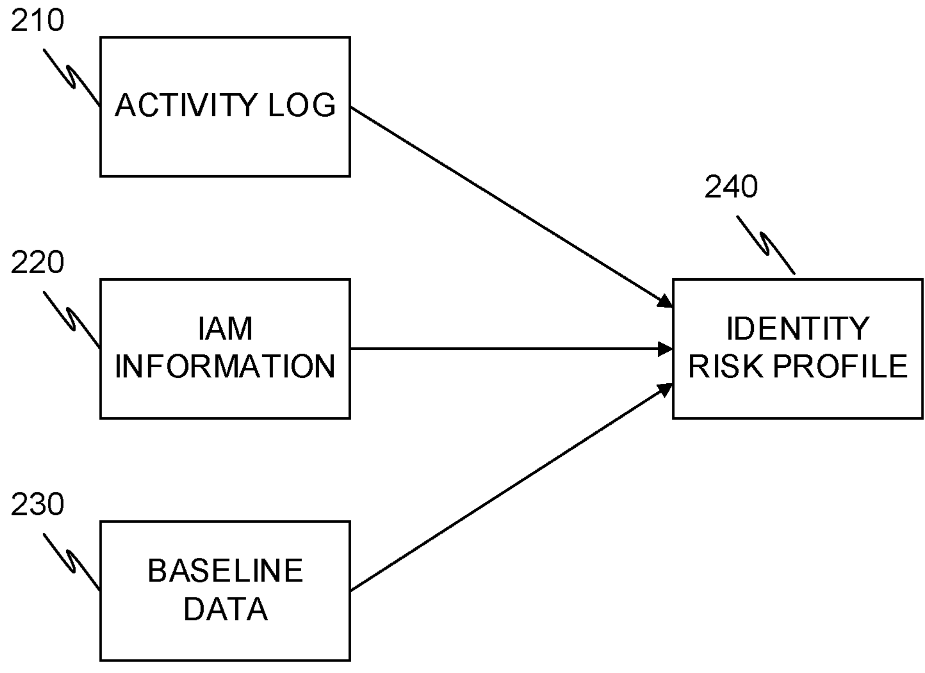
FIG. 2 is an example schematic illustration of an identity risk profile information flow, implemented in accordance with an embodiment.

FIG. 2 is an example schematic illustration of an identity risk profile information flow, implemented in accordance with an embodiment. In certain embodiments, an identity risk profile 240 is generated based on data received, accessed, a combination thereof, and the like, from a plurality of data sources.

In an embodiment, the plurality of data sources includes an activity log 210, an IAM information 220, and baseline data 230. In some embodiments, the activity log 210 includes data records from which events are extracted, each event corresponding to an identity, for example by parsing the log and searching for a data value corresponding an identifier of the identity.

In some embodiments, the activity log is generated by resources, workloads, and the like, deployed in the computing environment. For example, according to an embodiment, a serverless function is configured to write events to a bucket in a cloud computing environment. The events comprise together an activity log.

In certain embodiments, the activity log is accessed periodically to detect new activity, for example based on identifiers of a plurality of identities, based on an identifier of a single identity, etc.

In an embodiment, the plurality of data sources includes IAM information 220. In an embodiment, an identity and access management service is queried based on an identifier of an identity. In an embodiment, the IAM service is queried to determine if an identity includes valid user credentials. In some embodiments, the IAM service is queried to determine if an identity includes a permission to access a resource, a permission to initiate deployment of a resource (e.g., deploy a virtual machine), a permission to change access of another identity, a permission to revoke access of another identity, a permission to generate an identity, a combination thereof, and the like.

In certain embodiments, the plurality of data sources includes baseline data 230. In an embodiment, a baseline is generated for each identity. In some embodiments, the baseline includes a statistical representation of actions, events, and the like, associated with the identity. In an embodiment, the baseline is utilized to determine if a new action detected with respect to the identity (e.g., a new activity detected in an activity log) is likely to be a cybersecurity threat. For example, in an embodiment, a likelihood to be a cybersecurity threat is determined based on a probability value exceeding a threshold.

According to an embodiment, a baseline is established for each identity. In some embodiments, a baseline is established for a group of identities. In an embodiment, an identity is matched with a baseline of a group of identities, for example based on being associated with a user group. In some embodiments, an initial baseline identity is provided from the baseline of the group of identities, and is modified based on actions performed, detected, and the like, with respect to an individual identity. This allows to establish an initial baseline for a new identity.

Figure 3:
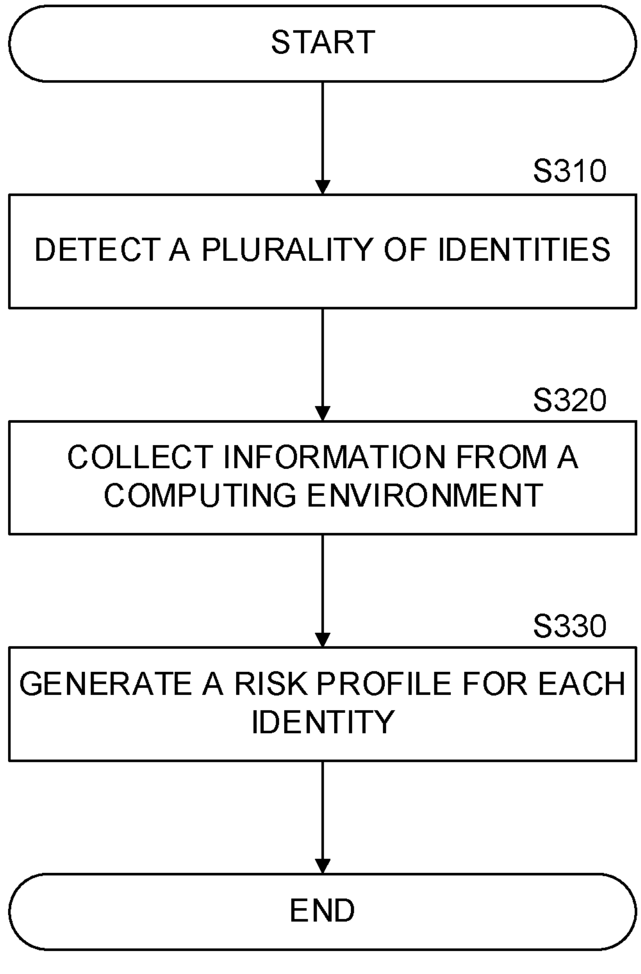
FIG. 3 is an example flowchart of a method for generating a cybersecurity risk profile for an identity of a computing environment, implemented according to an embodiment.

FIG. 3 is an example flowchart of a method for generating a cybersecurity risk profile for an identity of a computing environment, implemented according to an embodiment. According to an embodiment, a cybersecurity risk profile is generated for an identity which is deployed in a computing environment.

In some embodiments, a cybersecurity risk profile is generated for a user group. In certain embodiments, when a new user (i.e., new identity) is added to the user group, the new user is associated with the user group cybersecurity risk profile. In some embodiments, the new user cybersecurity risk profile is updated, for example based on a method disclosed herein.

At S310, a plurality of identities are detected. In an embodiment, the plurality of identities are detected in a computing environment, such as a cloud computing environment. In some embodiments, an identity is detected by querying an identity and access management (IAM) service.

For example, according to an embodiment, an IAM service is queried with an identifier of a computing environment, such as an identifier of a VPC, to detect principals deployed therein. In an embodiment, a principal is a user account, a service account, a user group, a system account, a local account, a combination thereof, and the like.

At S320, information is collected from the computing environment. In some embodiments, a plurality of data sources are utilized to provide the collected information. For example, in an embodiment, a cybersecurity monitoring system provides scanning data of a computing environment.

In certain embodiments, a data source is a network log, an activity log, a cybersecurity monitoring system, a ticket management system, a SaaS, a PaaS, an IaaS, an IAM service, a combination thereof, and the like.

In an embodiment, information is pulled from the data source, for example by an identity risk server configured to pull information from a data source. In some embodiments, the identity risk server is configured to receive, periodically receive, and the like, information from the data source.

In some embodiments, information is only received respective of certain predetermined identities. For example, in an embodiment, a first portion of identities are exempt from a cybersecurity risk profile, while a second portion of identities of the computing environment are not exempt. This is advantageous, for example, where a plurality of unused identities are deployed in a computing environment, or as another example where monitoring resources are directed only at certain types of identities (e.g., third party providers operating in the computing environment).

At S330, a risk profile is generated. In an embodiment, a risk profile is generated for each identity of the plurality of identities. In some embodiments, a risk profile is generated for a group of identities (e.g., a user group). In an embodiment, each identity in the identity group utilizes the group risk profile as an initial starting point for a risk profile, where the risk profile is further adapted based on additional information detected relating to a specific user account.

In certain embodiments, the risk profile is updated, generated, and the like based on information received respective of: a new device (e.g., a device having an identifier which was not previously detected), a new IP address, an existing IP address using a new port, a new geographical location, a new application use, use of a previously identified application as a risky application, an alert from a cybersecurity monitoring system, an upload transfer, a download transfer, a length of time between activities, a combination thereof, and the like.

In some embodiments, the risk profile is further generated based on an established baseline of an identity. In an embodiment, a baseline is generated for each identity. In some embodiments, the baseline includes a statistical representation of actions, events, and the like, associated with the identity. In an embodiment, the baseline is utilized to determine if a new action detected with respect to the identity (e.g., a new activity detected in an activity log) is likely to be a cybersecurity threat. For example, in an embodiment, a likelihood to be a cybersecurity threat is determined based on a probability value exceeding a threshold.

In an embodiment, an IAM service is configured to receive a risk profile. In certain embodiments, an identity risk server is configured to: provide a risk profile to the IAM server (or service), configured to update a policy of the IAM based on the risk profile, a combination thereof, and the like. In certain embodiments, the IAM server is configured to update a policy based on a received risk profile, an updated risk profile, etc.

In some embodiments, the IAM service, the identity risk server, a combination thereof, and the like, is configured to initiate a mitigation action, a remediation action, and the like, based on a risk profile, an updated risk profile, etc. For example, in an embodiment, an IAM service is configured to receive a risk profile, and initiate a mitigation action of revoking access from a user account associated with the risk profile.

Figure 4:
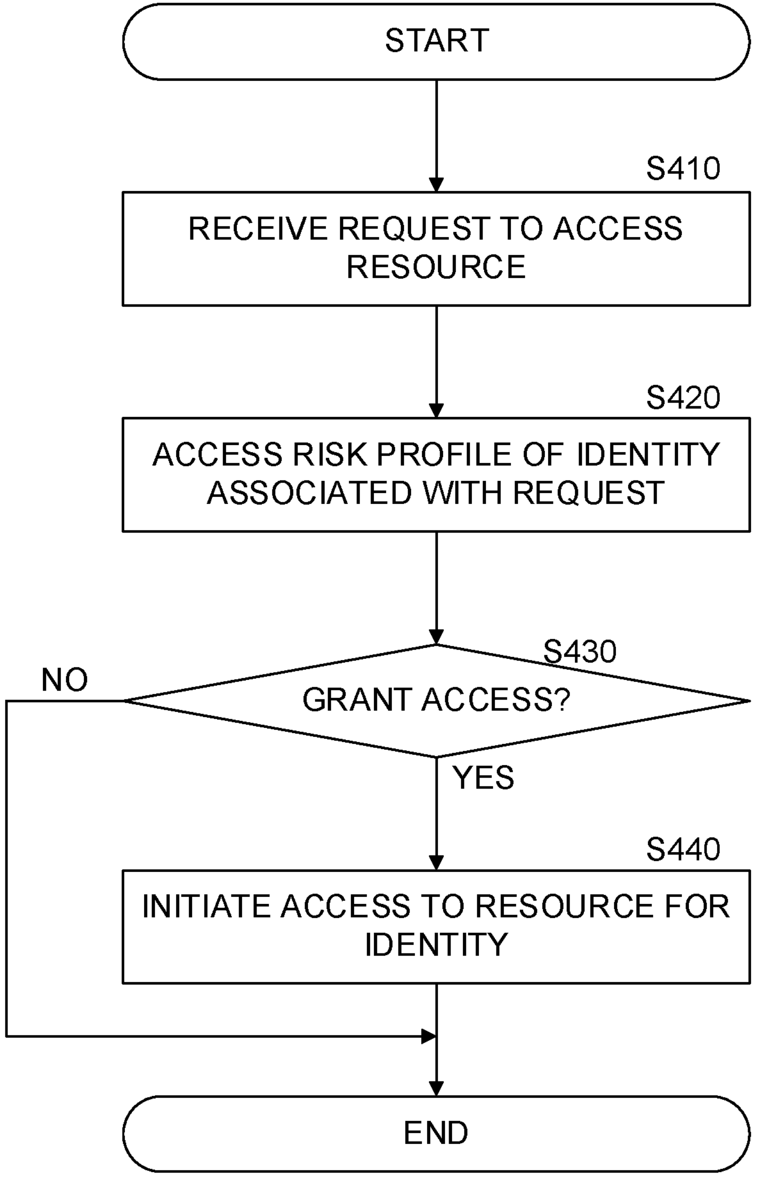
FIG. 4 is an example flowchart of a method for providing access to a resource based on a risk identity profile, implemented according to an embodiment.

FIG. 4 is an example flowchart of a method for providing access to a resource based on a risk identity profile, implemented according to an embodiment. In some embodiments, a risk identity profile is generated for an identity, and a cybersecurity risk score is determined based on a combination of identity information, resource information, and device information, wherein the device is associated with the identity. For example, according to an embodiment, the device is a laptop, on which a user account is logged in and provides user account credentials (e.g., password, account identifier, etc.).

At S410, a request to access a resource is detected. In some embodiments, the request to access a resource is received, for example from a user device associated with an identity. In an embodiment, the user device is a laptop, a personal computer, a public computer, a tablet, a smartphone, a combination thereof, and the like. In some embodiments, the user device includes a unique identifier, such as a MAC address, a name from a namespace, and the like. In an embodiment, the user device includes thereon an identifier, stored for example as a cookie, token, combination thereof, and the like.

In an embodiment, the resource is a file, an application, a server, a virtual instance, a virtual machine, a software container, a serverless function, a repository, a bucket, a distributed storage system, a database, various combinations thereof, and the like. In some embodiments, the resource is associated with a risk level. For example, in some embodiments, a cybersecurity monitoring system is configured to detect vulnerabilities, exposures, misconfigurations, malware, etc. in a computing system, such as on a virtual machine, a software container, a serverless function, and the like.

In certain embodiments, the cybersecurity monitoring system is further configured to determine a risk score for various resources deployed in a computing environment, for example based on a scan performed on the resource to detect cybersecurity threats.

At S420, an identity risk profile is detected. In an embodiment, the identity risk profile is detected based on the request to access the resource. In some embodiments, the identity risk profile is generated, for example, utilizing the methods described in more detail herein.

According to an embodiment, the identity risk profile indicates a cybersecurity risk associated with a particular identity. In an embodiment, the identity risk profile includes a statistical representation of actions, activities, and the like, which are associated with an identity.

In some embodiments, where no identity risk profile exists or is otherwise not detected for a particular identity, a user group associated with the identity is determined. For example, in an embodiment, a particular identity is associated with the "dev" user group, the "dev" user group having a set of predetermined permissions. In an embodiment, determining a user group is performed by querying an IAM service to detect a user group which is associated with the identity.

In an embodiment, the "dev" user group is associated with a group risk profile. In some embodiments, a group risk profile is generated for a user group, and applied to individual identities associated with the user group for which an individual identity risk profile was not established. This can be, for example, due to having little to no activity, resulting in not being able to establish a baseline for the particular identity.

In certain embodiments, the group risk profile is applied to the identity, in lieu of an individual identity risk profile which can be applied to the identity.

At S430, a check is performed to determine if access can be granted. In an embodiment, the determination is performed based on the identity risk profile, device information, and resource information. For example, in an embodiment, an aggregate cybersecurity risk score is determined based on a risk score associated with the identity risk profile, a risk score associated with the device, and a risk score associated with the resource.

In certain embodiments, the aggregate cybersecurity risk score is utilized to determine access, for example based on a predetermined threshold. In an embodiment, where access is denied, execution ends. In some embodiments, where access is granted, execution continues at S440.

At S440, access to the resource is initiated. In an embodiment, initiating access to the resource includes generating an instruction to indicate that the resource is accessible by the identity. In some embodiment, at S430 a determination is made to grant partial access to the resource, for example based on a value of the aggregate cybersecurity score. In some embodiments, the aggregate cybersecurity score is above a first threshold (i.e., full access is not granted) but below a second threshold (i.e., full denial is not warranted).

Such an embodiment occurs, for example, when a trusted identity, such as a system administrator, uses an unrecognized device. Rather than block access completely, limited access to a resource is granted. In an embodiment, limited access includes, for example, read only permission, download only permission, etc.

In certain embodiments, initiating access to the resource includes sending a security challenge to the device associated with the identity. For example, in an embodiment, based on the aggregate cybersecurity score, a secondary authentication is required. In such embodiments, a secondary authentication is, for example, a multi-factor authentication (MFA) challenge, such as providing a PIN, a password, a security token, a biometric, an OTP, an SMS verification, a combination thereof, and the like.

Figure 5:
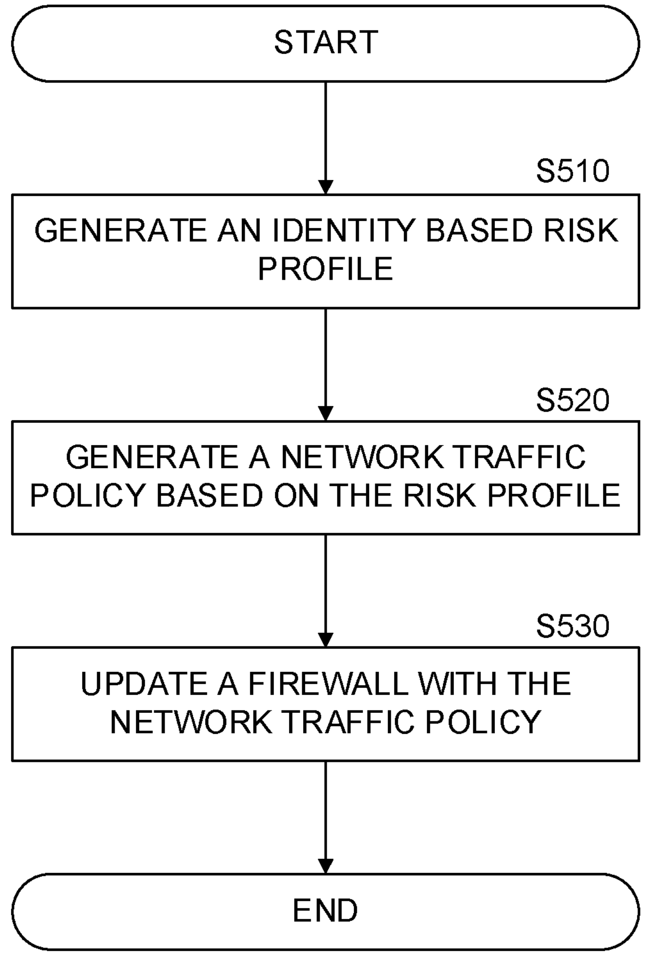
FIG. 5 is an example flowchart of a method for filtering network traffic based on an identity risk profile, implemented according to an embodiment.

FIG. 5 is an example flowchart of a method for filtering network traffic based on an identity risk profile, implemented according to an embodiment. In some embodiments, a firewall, a secure web gateway, and various components of SASE and SSE architectures are configured to block access, grant access, etc. to resources within a networked environment, such as a cloud computing environment.

At S510, an identity risk profile is generated. In an embodiment, the identity risk profile is generated for example based on the methods disclosed in more detail herein. According to an embodiment, the identity risk profile indicates a cybersecurity risk associated with a particular identity. In an embodiment, the identity risk profile includes a statistical representation of actions, activities, and the like, which are associated with an identity.

In some embodiments, the identity risk profile is associated with a user account, a service account, a user group, a system account, a local account, a combination thereof, and the like. In certain embodiments.

At S520, a network traffic policy is generated. In an embodiment, the network traffic policy is generated based on the identity risk profile, and device information from a device associated with the identity.

In some embodiments, the network traffic policy is further generated based on another entity which the identity is attempting to access. In an embodiment, the another entity is a resource, and the network traffic policy is generated further based on resource information (e.g., which resource is the identity attempting to access).

In certain embodiments, the another entity is a principal, such as a second user account, second service account, a new user account, etc., and the network traffic policy is further generated based on information relating to the principal.

According to an embodiment, the network traffic policy is generated based on a policy detected in a policy engine. For example, according to an embodiment, a policy engine includes a general policy, which has data fields that are customizable to apply to a specific resource, a specific identity, etc. In an embodiment, the network traffic policy includes a sunset provision (or expiry), after which the network traffic policy is no longer in effect.

In certain embodiments, the network traffic policy is generated based on a cybersecurity policy. In some embodiments, the cybersecurity policy includes a risk score threshold, indicating that network traffic, a resource, etc. which is associated with a risk score higher than the threshold, should be denied access.

For example, in an embodiment, an aggregate cybersecurity risk score is determined based on a risk score associated with the identity risk profile, a risk score associated with the device, and a risk score associated with the resource. In an embodiment, where the aggregate cybersecurity score exceeds the predetermined threshold set in the cybersecurity policy, a network traffic policy is generated to block traffic initiated between a device associated with the identity, and the resource.

At S530, the network traffic policy is applied. In an embodiment, applying the network traffic policy includes sending an instruction to a firewall, configuring a firewall, and the like, to filter, direct, deny, etc. network traffic based on the network traffic policy.

In some embodiments, applying the network traffic policy includes configuring components of a SASE, SSE, and the like architectures, to filter, direct, deny, etc. network traffic based on the network traffic policy.

In some embodiments, the network traffic policy is applied to intra-network traffic (i.e., traffic within the network), inter-network traffic (i.e., traffic to/from the network), a combination thereof, and the like.

Figure 6:
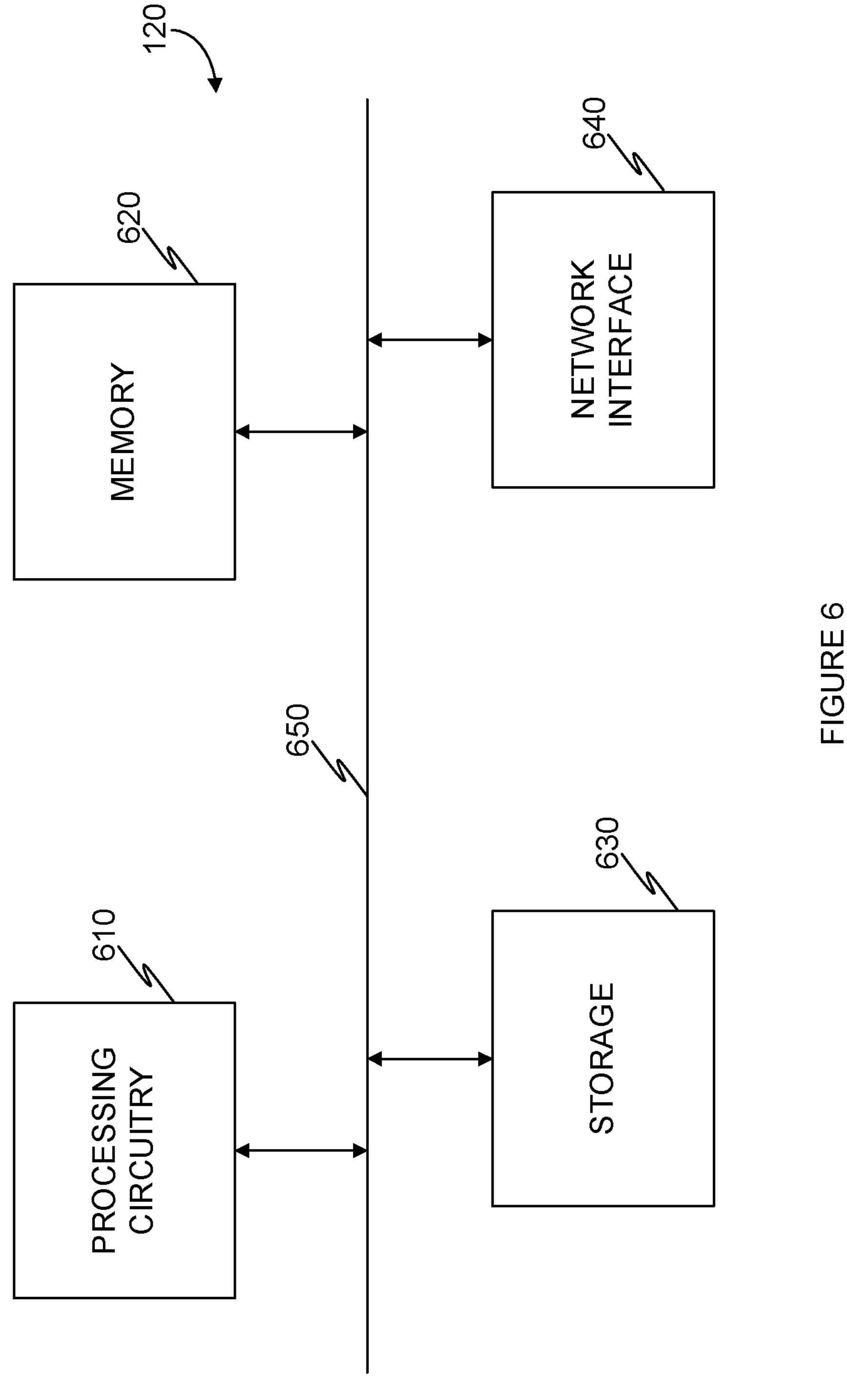
FIG. 6 is an example schematic diagram of an identity risk server according to an embodiment.

FIG. 6 is an example schematic diagram of a identity risk server 120 according to an embodiment. The identity risk server 120 includes a processing circuitry 610 coupled to a memory 620, a storage 630, and a network interface 640. In an embodiment, the components of the identity risk server 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the identity risk server 120 with communication with, for example, the computing environment 110, the IAM server 116, the log database 117, the policy engine 118, the firewall 115, etc.

It should be understood that the embodiments described herein are not limited to the specific architecture illustrated in FIG. 6, and other architectures may be equally used without departing from the scope of the disclosed embodiments.

Furthermore, in certain embodiments the policy engine 118, the IAM server 116, the firewall 115, and the like may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a cybersecurity risk profile based on an identity in a computing environment, comprising:

detecting a plurality of identities in a computing environment, each identity including a permission to initiate an action in the computing environment;

querying an identity and access management service to detect a permission associated with a first identity of the plurality of identities;

accessing an activity log of the computing environment;

parsing the activity log to detect an event based on the first identity;

generating an identity risk profile based on: the detected event, and the detected permission; and determining whether the detected event represents anomalous activity by comparing the detected event and the detected permission against an individualized historical baseline statistically generated specifically for the first identity, wherein the individualized historical baseline comprises statistical measures computed from historical activities uniquely associated with the first identity, and wherein anomalous activity is identified in real-time responsive to detecting a deviation of the event in view of the detected permission from the individualized historical baseline exceeding a predetermined threshold, wherein detecting the deviation comprises determining, based on the individualized historical baseline, a probability that the first identity initiates an action corresponding to the detected event in view of the detected permission, and wherein the deviation exceeds the predeterm ined threshold when the probability is below the predetermined threshold.

2. The method of claim 1, further comprising:

receiving a request to access a resource in the computing environment, the request including an identifier of the first identity; and determining a cybersecurity risk score based on the resource, and the identity risk profile.

3. The method of claim 2, further comprising:

providing access to the resource in response to determining that the cybersecurity risk score exceeds a threshold; and denying access to the resource in response to determining that the cybersecurity risk score is below the threshold.

4. The method of claim 2, further comprising:

initiating a mitigation action in response to detecting that the cybersecurity risk score exceeds a predetermined threshold.

5. The method of claim 4, further comprising:

generating an alert based on the mitigation action.

6. The method of claim 4, further comprising:

generating a network traffic policy in response to initiating the mitigation action.

7. The method of claim 6, further comprising:

configuring a firewall in the computing environment to filter network traffic based on the generated network traffic policy.

8. The method of claim 1, further comprising:

detecting new activity in the activity log for the first identity; and updating the identity risk profile based on the detected new activity.

9. The method of claim 1, further comprising:

generating an activity baseline for the first identity based on a plurality of events detected in the activity log.

10. A non-transitory computer-readable medium storing a set of instructions for generating a cybersecurity risk profile based on an identity in a computing environment, the set of instructions comprising:

one or more instructions that, when executed by one or more processors of a device, cause the device to:

detect a plurality of identities in a computing environment, each identity including a permission to initiate an action in the computing environment;

query an identity and access management service to detect a permission associated with a first identity of the plurality of identities;

access an activity log of the computing environment;

parse the activity log to detect an event based on the first identity;

generate an identity risk profile based on: the detected event, and the detected permission; and determine whether the detected event represents anomalous activity by comparing the detected event and the detected permission against an individualized historical baseline statistically generated specifically for the first identity, wherein the individualized historical baseline comprises statistical measures computed from historical activities uniquely associated with the first identity, and wherein anomalous activity is identified in real-time responsive to detecting a deviation of the event in view of the detected permission from the individualized historical baseline exceeding a predetermined threshold, wherein detecting the deviation comprises determining . . . based on the individualized historical baseline, a probability that the first identity initiates an action corresponding to the detected event in view of the detected permission, and wherein the deviation exceeds the predetermined threshold when the probability is below the predetermined threshold.

11. A system for generating a cybersecurity risk profile based on an identity in a computing environment comprising:

a processing circuitry;

a memory, the memory containing instructions that, when executed by the processing circuitry, configure the system to:

detect a plurality of identities in a computing environment, each identity including a permission to initiate an action in the computing environment;

query an identity and access management service to detect a permission associated with a first identity of the plurality of identities;

access an activity log of the computing environment;

parse the activity log to detect an event based on the first identity;

generate an identity risk profile based on: the detected event, and the detected permission; and determine whether the detected event represents anomalous activity by comparing the detected event and the detected permission against an individualized historical baseline statistically generated specifically for the first identity, wherein the individualized historical baseline comprises statistical measures computed from historical activities uniquely associated with the first identity, and wherein anomalous activity is identified in real-time responsive to detecting a deviation of the event in view of the detected permission from the individualized historical baseline exceeding a predetermined threshold, wherein detecting the deviation comprises determining ba ed on the individualized historical baseline, a probability that the first identity initiates an action corresponding to the detected event in view of the detected permission, and wherein the deviation exceeds the predetermined threshold when the probability is below the predetermined threshold.

12. The system of claim 11, wherein the memory contains further instructions which when executed by the processing circuitry further configure the system to:

receive a request to access a resource in the computing environment, the request including an identifier of the first identity; and determine a cybersecurity risk score based on the resource, and the identity risk profile.

13. The system of claim 12, wherein the memory contains further instructions which when executed by the processing circuitry further configure the system to:

provide access to the resource in response to determining that the cybersecurity risk score exceeds a threshold; and deny access to the resource in response to determining that the cybersecurity risk score is below the threshold.

14. The system of claim 12, wherein the memory contains further instructions which when executed by the processing circuitry further configure the system to:

initiate a mitigation action in response to detecting that the cybersecurity risk score exceeds a predetermined threshold.

15. The system of claim 14, wherein the memory contains further instructions which when executed by the processing circuitry further configure the system to:

generate an alert based on the mitigation action.

16. The system of claim 14, wherein the memory contains further instructions which when executed by the processing circuitry further configure the system to:

generate a network traffic policy in response to initiating the mitigation action.

17. The system of claim 16, wherein the memory contains further instructions which when executed by the processing circuitry further configure the system to:

configure a firewall in the computing environment to filter network traffic based on the generated network traffic policy.

18. The system of claim 11, wherein the memory contains further instructions which when executed by the processing circuitry further configure the system to:

detect new activity in the activity log for the first identity; and update the identity risk profile based on the detected new activity.

19. The system of claim 11, wherein the memory contains further instructions which when executed by the processing circuitry further configure the system to:

generate an activity baseline for the first identity based on a plurality of events detected in the activity log.

* * * * *